United States Patent [19]
McQuarrie et al.

[11] Patent Number: 5,143,187
[45] Date of Patent: Sep. 1, 1992

[54] ENERGY ABSORBER FOR HORIZONTAL LIFELINES IN FALL ARREST SYSTEMS

[75] Inventors: Raymond H. McQuarrie, Brampton; Andrew C. Sulowski, Etobicoke, both of Canada

[73] Assignee: Ontario Hydro, Toronto, Canada

[21] Appl. No.: 644,383

[22] Filed: Jan. 22, 1991

[51] Int. Cl.$^5$ .............................................. F16F 7/12
[52] U.S. Cl. ........................................ 188/376; 182/3
[58] Field of Search ................... 188/371, 376; 182/3, 182/4; 248/548

[56] References Cited

U.S. PATENT DOCUMENTS

| | | | |
|---|---|---|---|
| 3,444,957 | 5/1969 | Ervin | 182/3 |
| 3,504,460 | 4/1970 | Solberg | 188/376 X |
| 3,550,957 | 12/1970 | Radke | 188/371 X |
| 3,937,407 | 2/1976 | Matsuo | 188/376 X |
| 4,588,208 | 5/1986 | Yoshitsugu | 188/376 X |
| 4,753,772 | 6/1988 | Schmertz | 188/376 |

FOREIGN PATENT DOCUMENTS 2136915 9/1984 United Kingdom .

Primary Examiner—Robert J. Oberleitner
Assistant Examiner—Lee W. Young

[57] ABSTRACT

An energy absorber for a fall protection system employing a horizontal lifeline comprises an elongate, flexible strength component to opposite ends of which is transmitted the tension shock load produced in the lifeline by arresting a fall and a plurality of sequential energy components operatively connected to the strength component, so that tension applied at opposite ends of the strength component is borne by each of the energy absorbing components and only after its predecessor has broken. The breaking strength of each energy absorbing component, which may be a linear segment of stainless steel aircraft cable, is selected not exceed a desired maximum arrest load. The number of energy absorber components is selected so that not all of them will break when the fall protection system arrests the fall of an object of a predetermined mass falling freely a predetermined distance.

6 Claims, 2 Drawing Sheets

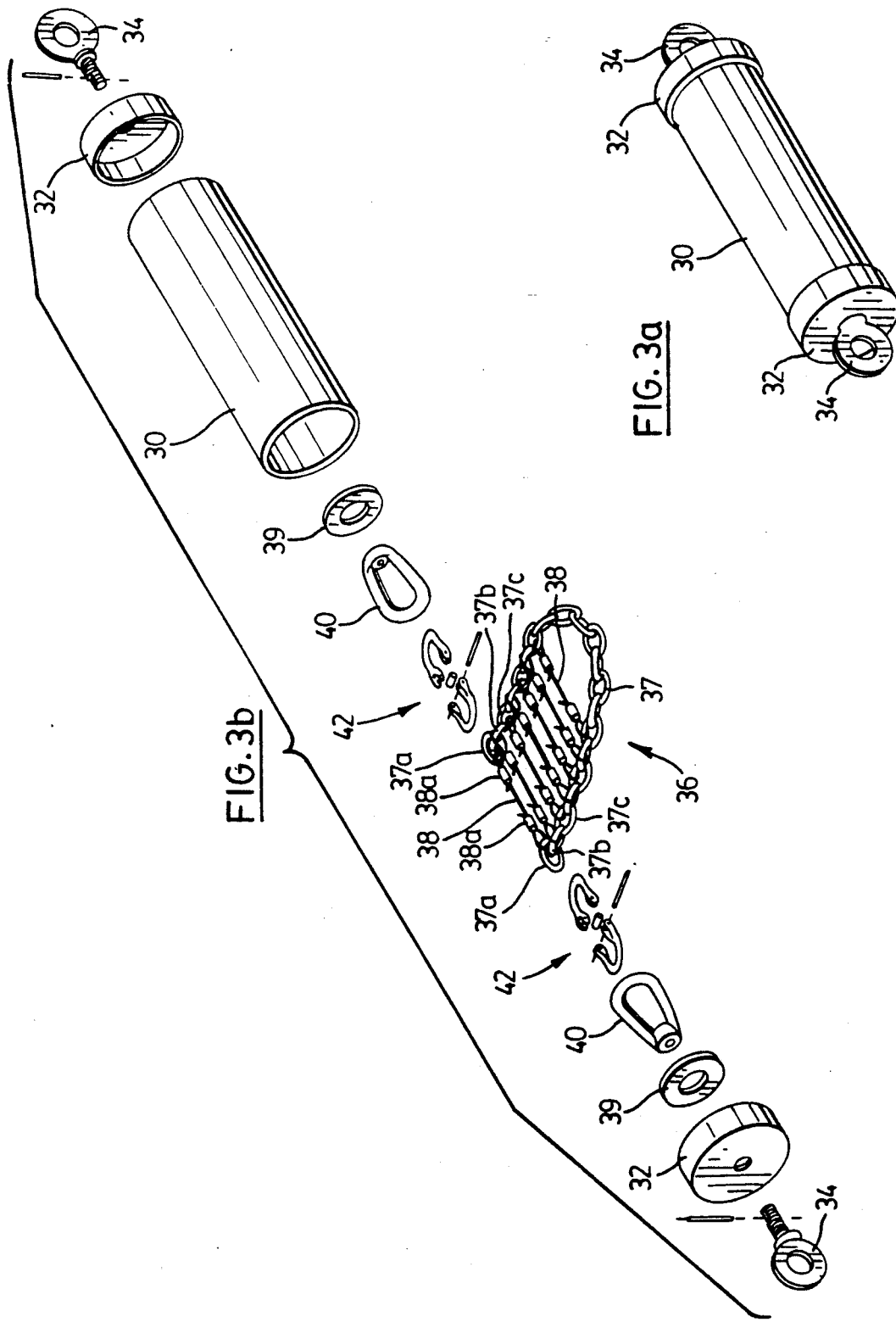

ENERGY ABSORBER FOR HORIZONTAL LIFELINES IN FALL ARREST SYSTEMS

BACKGROUND OF THE INVENTION

1. Field of the Invention

This invention relates to energy absorbers for use in a fall protection system (FPS) to reduce the shock load acting on the anchorage of a horizontal lifeline of the FPS when the free fall of an object or person is arrested thereby within a fall distance determined by the FPS. More particularly, this invention relates to an energy absorber (EA) comprising a load carrying component which determines the ultimate strength of the EA and a plurality of energy absorbing components having selected breaking strengths and arranged to break sequentially when a shock load is imposed on the EA, to ensure that the force acting on the anchorage does not exceed a predetermined level.

2. Prior Art

Conventional FPS's for use by workers on construction sites comprise a safety harness worn by the worker and a short lanyard attached thereto at one end and at the other end to a vertical lifeline (VLL) anchored at its highest point to the structure being worked on or to a permanent horizontal lifeline (HLL) installed outdoors and extending between two anchorages.

In many applications, for example power line maintenance, the structure being worked on will present a number of projecting members which could seriously injure a falling worker if he or she were not brought to a stop within a short distance. Safety regulations of the Province of Ontario allow a maximum permissible free fall distance in FPS's of 1.5 m.

In order that the peak arresting force on the individual using an FPS not exceed a level which would be physically injurious when the lanyard is fully extended at the end of the fall, it is well known to include a shock absorber positioned between the lanyard and a harness to absorb the kinetic energy generated by a worker falling the limiting distance. An example of such a shock absorber is shown in U.K. patent application No. 2,136,915 published Sept. 26, 1984.

Conventional shock absorber devices are designed to lower the maximum arrest force (MAF) acting on the user of an FPS. It is desirable, particularly for use in conjunction with a permanent HLL system, that energy absorbing means be incorporated within the lifeline itself to reduce the maximum arrest load (MAL) acting on the anchorages of the horizontal lifeline. Known "personal" FPS shock absorbers of the kind utilizing breakable stitching within webbing to absorb shock would not be suitable for installation on a permanent HLL system, because of the susceptibility to degradation of the constituent materials by weathering and the different force levels at which such shock absorbers operate.

It is accordingly one object of the present invention to provide an EA for installation in an HLL system to reduce the MAL acting on the lifeline anchorages to acceptable levels.

It is a further object of the invention to provide an EA as aforesaid which is of simply, durable construction and is easily maintained.

SUMMARY OF THE INVENTION

With a view to achieving the aforesaid objects, there is provided an energy absorber for a fall protection system with a horizontal lifeline. The energy absorber includes an elongate, flexible strength component, to opposite ends of which is transmitted the tension shock load produced in the horizontal lifeline by arresting a fall. The strength component has a selected static breaking strength which is greater than the maximum tension shock load encountered in the projected use of the fall protection system. A plurality of sequential energy absorbing components is operatively connected to the strength component so that tension applied at opposite ends thereof is borne by each of the energy absorbing components only after its predecessor has broken. The breaking strength of each energy absorbing component is selected not to exceed a desired maximum arrest load and the number of such components is selected so that not all of them will break when the fall protection system arrests the fall of a predetermined mass falling freely a predetermined distance, i.e. for a given energy input into the fall protection system.

In a preferred embodiment, the strength component is a flexible metal chain, of which corresponding links equidistant from the end link, are connected by short segments of stainless steel aircraft cable.

Conventional means are used for connecting the energy absorber into the horizontal lifeline system so that the tension shock load is transmitted through it. Thus, each end link of the chain may be connected, through a connecting link, to an eye-nut/eye-bolt connection, with respective spliced ends of the lifeline firmly affixed to the eye-bolts.

Other objects and advantages of the invention will be apparent from the detailed description which follows, read in conjunction with the accompanying drawings, wherein like reference numerals refer to identical or similar parts throughout the several views.

BRIEF DESCRIPTION OF THE DRAWINGS

FIG. 3a is a perspective view of a preferred embodiment of the EA according to the invention; and FIG. 3b is an exploded view of the embodiment of FIG. 3a, showing the arrangement of interconnecting components.

DESCRIPTION OF THE PREFERRED EMBODIMENT

The EA according to the present invention can be employed in any of a variety of FPS configurations in which a shock load is transmitted to an anchorage or anchorages through a lifeline.

Figure 1:
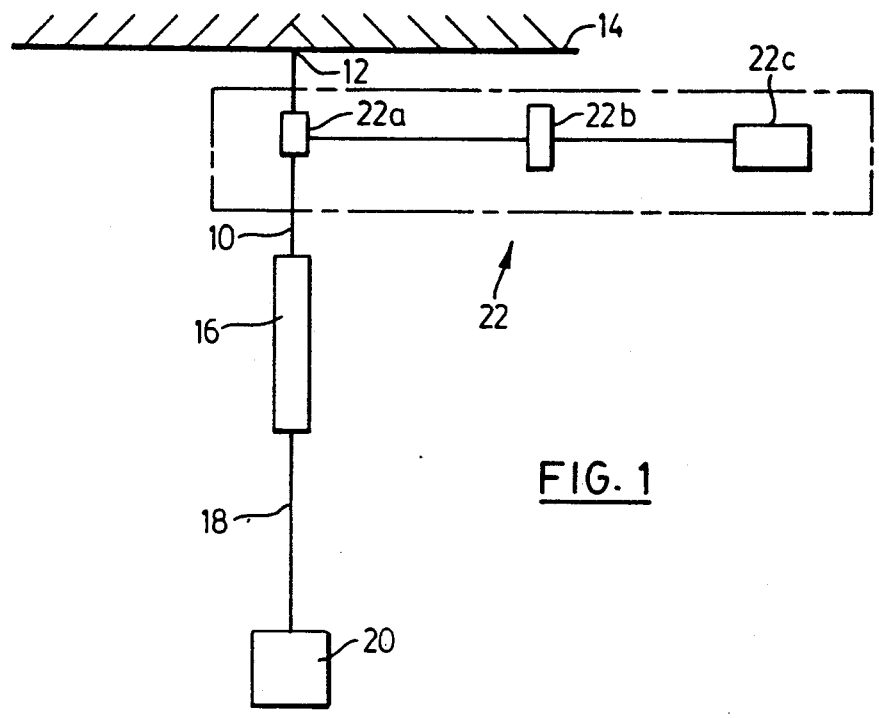
FIG. 1 is a schematic drawing of apparatus used to test the performance of an EA according to the invention in a VLL arrangement.

An experimental testing arrangement for an FPS configuration utilizing a VLL is schematically illustrated in FIG. 1. A VLL 10 was anchored at its top end at point 12 to a fixed, rigid horizontal surface 14 and at its bottom end to one end of EA 16 according to the invention. The other end of the EA 16 was attached to a freely hanging chain 18, representing the belt or lanyard of an FPS suspending a 100 kg test mass 20.

In conducting the series of tests described below, test mass 20 was raised 1.5 m vertically towards the EA 16 and allowed to fall freely. The MAL acting on the anchorage of VLL 10 was measured by means of a conventional system, indicated generally at 22, comprising a load cell 22a connected to the VLL to measure the tension therein and a strain amplifier 22b and digital oscilloscope 22c operatively connected to the load cell.

Figure 2:
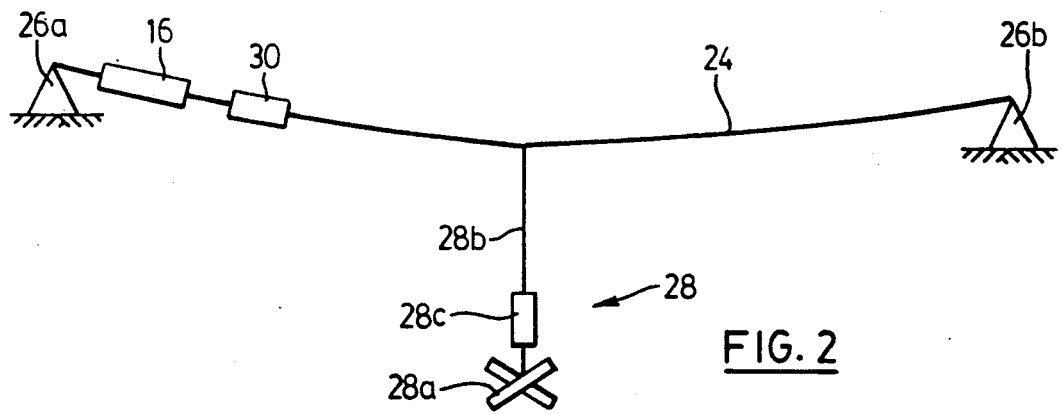
FIG. 2 is a schematic drawing illustrating the installation of an EA according to the invention in association with a permanent HLL system.

The installation of an EA according to the invention in an FPS configuration involving an HLL is schematically illustrated in FIG. 2. HLL 24 is strung between anchorages 26a and 26b. Attached by a hook or other means (not shown) from the HLL is a conventional FPS for use by a worker, indicated generally at 28, comprising a safety harness 28a, a lanyard 28b and, optionally, a shock absorber 28c.

In the arrangement of FIG. 2, an EA 16 according to the invention is connected at opposite ends thereof to HLL 24. The EA device should be installed in the HLL in the vicinity of one of the permanent anchorages for easier access and maintenance. As will be described below, the particular embodiment of EA tested was designed to ensure that the force acting on the HLL anchorages stays below 18 kN for a falling mass of 100 kg or less and a fall distance no greater than 1.5 m. However, the use of more than one EA simultaneously and connected in series allows for an MAL of 18 kN or less with larger energy inputs, i.e. more massive falling objects.

As a practical matter, use of an HLL rather than a VLL also requires the installation of a line tensioner, indicated at 30 in FIG. 2, so that precise measurement of the lengths of the HLL segments connecting the EA is not required. Line tensioner 30 is a conventional component, typically of turnbuckle-type construction.

FIG. 3a illustrates a preferred embodiment of the EA 16 of the invention and associated components, assembled for installation on a lifeline. A tubular plastic or metal housing 30 for the tension bearing components has a removable cap 32 at each end, each end cap presenting a central aperture therethrough for respective eye bolts 34, which in use are connected to the lifeline by conventional spliced loops in the lifeline, interlocking with the eye bolt apertures.

A particular embodiment of the energy absorbing means which is the subject of the present invention is seen in the exploded view of FIG. 3b, where it is indicated generally by the numeral 36. The EA 36 comprises a strength component, which in the embodiment illustrated is a metal chain 37, and a plurality (seven in the illustrated embodiment) of failure bound/energy absorbing components 38. These may be short segments of aircraft cable, each having an appropriate breaking strength as discussed below. Cable segments 38 are connected to the links of chain 37 in such a manner that when a tensile force is applied to eye bolts 34 the cable segment connected to the end links 37a of chain 37 is tensioned while the other cable segments are not.

The successive elements operatively connecting each eye bolt 34 to its associated chain end link 37a are an eye nut 40, a flat washer 39 being disposed inside end cap 32 between eye nut 40 and eye bolt 34, and a connecting link 42 to connect eye nut 42 to chain link 37a.

Successive links 37b, 37c, etc. are connected at their opposite ends to corresponding link pairs of chain 37, moving away from the ends of the chain, so that chain 37 assumes a U-shaped configuration. Opposed links in the arms of the "U" are joined by successive parallel transverse cable segments 38. That connection is advantageously made by a conventional looped spliced secure by swaged fittings (compression ferrules) 38a.

When the force applied to eye bolts 34 exceeds the breaking strength of the tensioned first cable segment this segment breaks and the next cable segment takes on the load. Through the sequential loading and breaking of the cable segments, the kinetic energy of the falling mass is absorbed and, in consequence, the shock load transmitted to the VLL or HLL anchorages is reduced.

The number of cable segments 38, their diameter and the type of wire rope employed is a matter of selection for the particular application, as is the nature of the basic strength component 37. Thus, for example, different sizes of chain and cables might be used or different materials, such as webbing in place of the chain segment 37 and synthetic fiber rope for the cable segments 38.

In the embodiment of EA illustrated and tested to obtain the experimental results given below, strength component 37 is a metal chain having a static breaking strength of about 111 kN and each energy absorbing component 38 is a section of $7 \times 19$ stainless steel aircraft cable of diameter 5/32". The particular embodiment described was made with a view to ensuring that in any HLL system associated with an FPS having no shock absorbing means of its own, the force acting on the HLL anchorage means would remain below 18 kN, as long as the falling mass is 100 kg or less and the fall distance is below 1.5 m.

EXPERIMENTAL EXAMPLES

Table I below sets out the results of tests conducted on an EA according to the invention, in which a mass of 100 kg was allowed to fall freely a distance of 1.5 m before activating the EA. In Table I, "Vertical Mode" refers to the VLL arrangement of FIG. 1 and "Horizontal Mode" to the HLL arrangement of FIG. 2. It was found that the MAL acting on the anchorage of VLL or HLL was 11.5 kN (excluding test results 8, 18 and 19 for the reasons set out at the bottom of Table I).

Table II below presents the results of tests conducted with no EA in the lifeline, the free falls of the test mass being arrested by the chain alone. It will be seen from tests 5 and 6 of Table II that the average MAL of 59.5 kN is more than five times greater than when the EA is installed.

When fabricated with chain and aircraft cable as described above, the EA device of the present invention is practically maintenance free. A recommended frequency of inspection is once every twelve months. Replacement of the device is required after deployment during an arresting service. Deployment is indicated by an open end of the device and/or the protruding chain with the broken cable segments.

TABLE I

ANRAY ENERGY ABSORBER TEST RESULTS

TEST PARAMETERS: Test Mass = 100 kg
Free Fall Distance = 1.5 m

| TEST NO | Number of Cables | Cable No 1 | Cable No 2 | Cable No 3 | Cable No 4 | Cable No 5 | Cable No 6 | Cable No 7 | Maximum Arrest Load (kN) |
|---|---|---|---|---|---|---|---|---|---|
| (A) Vertical Mode | | | | | | | | | |
| 1 | 5 | N/A* | N/A | N/A | 12.5 | N/A | — | — | 12.5 |
| 2 | 5 | N/A | N/A | N/A | 11.9 | N/A | — | — | 11.9 |
| 3 | 5 | N/A | N/A | N/A | N/A | 11.8 | — | — | 11.8 |
| 4 | 5 | 9.4 | 7.4 | 12.0 | 9.9 | 8.9 | — | — | 12.0 |
| 5 | 5 | 10.0 | 10.4 | 11.0 | 11.7 | 6.2 | — | — | 11.7 |
| 6 | 5 | 9.2 | 10.0 | 11.2 | 10.6 | 6.7 | — | — | 11.2 |
| 7 | 5 | 8.8 | 10.0 | 11.2 | 11.1 | 11.4 | — | — | 11.4 |
| 8* | 5 | 8.5 | 8.2 | 10.2 | 10.9 | 17.5 | — | — | 17.5 |
| 9 | 5 | 8.4 | 8.3 | 10.0 | 9.4 | 10.4 | — | — | 10.4 |
| 10 | 5 | 7.5 | 7.6 | 10.4 | 7.3 | 9.9 | — | — | 10.4 |
| 11 | 5 | 8.7 | 10.3 | 9.1 | 8.1 | 10.9 | — | — | 10.9 |
| 12 | 7 | 9.7 | 8.0 | 8.8 | 7.0 | 9.4 | 11.0 | not loaded | 11.0 |
| 13 | 7 | 9.6 | 11.1 | 9.9 | 11.1 | 12.0 | not loaded | not loaded | 12.0 |
| 14 | 7 | 8.2 | 10.6 | 9.2 | 8.5 | 11.4 | 7.2 | not loaded | 11.4 |
| 15 | 7 | 6.6 | 10.4 | 9.9 | 8.2 | 9.9 | 10.6 | not loaded | 10.6 |
| 16 | 7 | 9.1 | 11.4 | 11.5 | 10.8 | 11.7 | not loaded | not loaded | 11.7 |
| 17 | 7 | 8.5 | 12.7 | 9.8 | 7.1 | 10.8 | 11.6 | not loaded | 12.7 |
| (B) Horizontal Mode | | | | | | | | | |
| 18* | 7 | 8.6 | not loaded | not loaded | not loaded | not loaded | not loaded | not loaded | 8.6 |
| 19* | 7 | 9.6 | not loaded | not loaded | not loaded | not loaded | not loaded | not loaded | 9.6 |
| 20 | 7 | 11.2 | 8.5 | 10.9 | 9.2 | 11.5 | 6.8 | not loaded | 11.5 |

*NOTES:
N/A - data is "Not Available"
Test #8 - the high MAL was due to partial arrest by the chain, resultant of an insufficient quantity of chain links at the fifth cable.
Tests #18 & 19 - a shock absorber was employed in the FAS (vertical) component of the test thereby limiting the load input to the horizontal lifeline to an amount insufficient to break the first cable in the Anray EA.

TABLE II

MAXIMUM ARREST LOADS WITHOUT ANRAY ENERGY ABSORBER

| TEST NO | TEST MASS (kg) | FREE FALL DISTANCE (m) | MAXIMUM ARREST LOAD (kN) |
|---|---|---|---|
| 1 | 100 | 0.5 | 38 |
| 2 | 100 | 0.75 | 40 |
| 3 | 100 | 0.5 | 35 |
| 4 | 100 | 0.75 | 39 |
| 5 | 100 | 1.5 | 61 |
| 6 | 100 | 1.5 | 58 |

Although one embodiment of the invention has been described in detail for illustrative purposes, it will be understood that it is not intended thereby to impose a limitation to the specific construction shown and described herein, as various modifications apparent to those skilled in the art may be made thereto. The invention sought to be protected is defined by the appended claims.

We claim:

1. An energy absorber for a horizontal lifeline used in a fall protection system, comprising:
an elongate, flexible strength component to opposite ends of which is transmitted the tension shock load produced in the horizontal lifeline by arresting a fall, said strength component being a metal chain having a selected static breaking strength greater than the maximum tension shock load encountered in use of the fall protection system; and
a plurality of sequential and independent energy absorbing components being linear segments, each firmly attached at opposite ends thereof to corresponding links of said chain, so that said chain is held by said energy absorbing components in the shape of a loop open at the ends of the chain and tension applied at opposite ends of said chain is borne by each of said energy absorbing components only after the preceding energy absorbent component has broken, the breaking strength of each said energy absorbing component being selected not to exceed a desired maximum arrest load and the number of said energy absorbing components being selected so that not all of them will break when the fall protection system arrests the fall of an object of a predetermined mass falling freely a predetermined distance.

2. An energy absorber according to claim 1, further comprising means for connecting opposite end links of said chain to spliced ends of said horizontal lifeline transmitting the tension shock load produced in the horizontal lifeline to opposite ends of said chain.

3. An energy absorber according to claim 2, wherein said means for connecting opposite end links of said chain to spliced ends of said horizontal lifeline comprises a pair of eye-bolts for attachment to respective spliced ends of said horizontal lifeline, a pair of eye-nuts for receiving respective eye-bolts, and a pair of flexible connecting links for connecting respective eye-nuts to respective end links of said chain.

4. An energy absorber according to claim 1, wherein each of said energy components is a linear segment of stainless steel aircraft cable.

5. An energy absorber according to claim 1, or claim 4, wherein said maximum arrest load is about 18 kN.

6. An energy absorber according to claim 1, wherein said corresponding links of the chain are equidistant from respective end links of the chain.

* * * * *